United States Patent [19]

Desprez et al.

[11] Patent Number: 4,708,728
[45] Date of Patent: Nov. 24, 1987

[54] DEVICE TO IMPROVE THE HEATING OF A GLASS DISTRIBUTION CHANNEL AND PROCESS FOR OPERATING SUCH DEVICE

[75] Inventors: Marc Desprez, Ville d'Avray; Michel Roux, Marnes-la-Coquette, both of France

[73] Assignee: L'Air Liquide, Paris, France

[21] Appl. No.: 908,351

[22] Filed: Sep. 16, 1986

[30] Foreign Application Priority Data

Sep. 20, 1985 [FR] France .................. 85 13949

[51] Int. Cl.⁴ .............................................. C03B 5/04
[52] U.S. Cl. ........................................ 65/136; 65/135; 65/161; 65/346; 65/347; 431/10; 431/12; 431/167
[58] Field of Search ............... 431/10, 12, 167; 65/346, 347, 135, 136, 137, 161

[56] References Cited

U.S. PATENT DOCUMENTS

| | | | |
|---|---|---|---|
| 2,499,207 | 2/1950 | Wolfersperger | 431/10 |
| 3,321,288 | 5/1967 | Griem, Jr. | 65/347 |
| 3,733,165 | 5/1973 | Nakagawa et al. | 431/10 |
| 3,954,433 | 5/1976 | Holler | 65/161 |

FOREIGN PATENT DOCUMENTS

| | | |
|---|---|---|
| 1450020 | 10/1965 | France . |
| 1479461 | 3/1966 | France . |
| 0643717 | 1/1979 | U.S.S.R. .................. 431/12 |

Primary Examiner—Arthur Kellogg
Attorney, Agent, or Firm—Lee C. Robinson, Jr.

[57] ABSTRACT

Device for improving the heating of a channel (2) for distribution of glass (1), said device including a cylindrical duct (6) connected at its upstream end to means (7) for feeding a premixture of air and fuel gas and whose downstream end (8) opens inside a cylindrical bore (9) in a refractory block (10) inserted in a wall (11) of the channel, said cylindrical bore (9) extending by means of a coaxial cylindrical duct (12), of smaller diameter than that of said bore, the cylindrical channel (6) being surrounded by a sealing ring (13) which covers the face of the cylindrical bore (9) in which said channel (6) is inserted. According to the invention, the device comprises a capillary tube (20) coaxially disposed with respect to said duct (6) and whose diameter is smaller than the diameter of said duct (6), said capillary tube (20) being connected at its upstream end to oxygen feeding means (21) opening at the downstream end (8) of said duct (6) between the end (22) of the coaxial cylindrical duct located toward said channel and the downstream end (8) of said duct (6).

8 Claims, 4 Drawing Figures

DEVICE TO IMPROVE THE HEATING OF A GLASS DISTRIBUTION CHANNEL AND PROCESS FOR OPERATING SUCH DEVICE

BACKGROUND OF THE INVENTION (a) Field of the Invention

The present invention relates to a device for improving the heating of a glass distribution channel, said device including a cylindrical duct whose upstream end is connected to means for feeding a premixture of air and fuel gas and whose downstream end opens inside a cylindrical bore into a refractory block which is inserted in a wall of the channel, said cylindrical bore having an extension consisting of a cylindrical axial duct of smaller diameter than said bore, the cylindrical duct being surrounded by a sealing ring which covers the face of the cylindrical bore into which said duct is inserted.

(b) Description of the Prior Art

A continuous glass production line comprises in succession a compounding shop where the mixture of the raw materials which are introduced into the melting oven is introduced, followed by a pre-basin in which the molten glass passes in order to be degasified, and one or more distribution channels connected to shaping machines. These distribution channels have dual purpose, i.e. transportation of the molten glass and temperature conditioning same.

Transportation of the molten glass is carried out by gravity and the latter flows at low speed, of the order of a few meters per hour.

Temperature conditioning of the glass is the most important function of the feeder, since it is responsable for the manufacture of a product of high and uniform quality. This conditioning function comprises for example three sub-functions:

Modification of the temperature of the molten glass: in general, cooling of the glass from the temperature of the oven to the shaping temperature (in certain cases heating up of the glass).

Uniformize the temperature of the glass, in order to limit transversal and vertical temperature gradients.

Control of the temperature of the glass sent to the shaping machines.

The first sub-function can be carried out in two different ways:

(1) The glass is abruptly cooled down during a short period of time after which its temperature is allowed to become uniform. This method requires internal cooling means, such as ventilation, water circulation, which reduce the true yield of the heating equipment provided for maintaining a sufficient level of temperature in the channel. Moreover, this technique requires some knowledge of the glass flow in the channel so as to prevent unnecessarily high transversal gradients of temperature.

(2) The glass is cooled down in a continuous and very slow manner. With this technique, it is only sufficient to rely on the natural cooling down resulting from the losses in the walls of the channel.

To realize the second sub-function (to uniformize the temperature of the glass), it is necessary to heat the marginal zones of the upper surface of the glass vein, because the exterior layers of this vein cool down much more rapidly than the core, since glass is a good insulating material and even in a mass of hot glass, the heat transfers are small. The burners used to reheat the marginal zones of the glass vein are generally supplied from a feed tank containing a premixture of cold air and of the fuel gas used, which presents some danger if the flame is put out.

To realize the third sub-function which is made necessary to obtain a uniform quality of the finished product, the channel comprises a plurality of successive zones whose heating is totally controlled from a unique temperature probe.

In a feeder intended for molten glass, the glass normally flows in a refractory channel whose sides and bottom portion are insulated, towards a feeding basin located upstream of the channel. For relatively small flows, heat is generally supplied by means of burners mounted in the lateral walls of the feeders in oder to try to maintain the glass in molten condition at the temperature required for distribution in the basin. At a higher flow, small amounts of heat may be applied selectively, and a removal of the heat is necessary for the increased flow as this is the case in the feeders presently built.

In order to save energy by reducing the size of the tank of nitrogen which is present in the fumes which are released by a burner and to increase the real temperature of the flame of a burner, it is known to mix oxygen with the fuel gas in a quantity which varies. Different well known methods can be considered for this addition of oxygen to a premixture of air and fuel gas:

The dilution which consists in mixing the additional oxygen in the duct which is used for feeding the mixture of air and fuel gas. The plurality of burners constituting a zone of the feeder would lead to problems of safety if pure oxygen would be introduced in the auxiliary tank containing the premixture, in view of the modifications of the limits of inflammability of the mixture, and the increase of the speed of combustion with respect to a reduction of the speed at which the mixture passes through the auxiliary tank and the burner. Indeed, if one volume of oxygen is introduced, the quantity of air must be reduced at the rate of 5 volumes, which means that the flow must be modified, i.e. the rate of flow of the mixture in the ducts. In practice, this solution is therefore not acceptable.

A second method consists in using a jet for injecting pure oxygen, i.e. the oxygen is introduced by means of a pipe which is separate from the pure oxygen burner and is located near the flame of the burner. This technique is particularly complicated, in view of the short distance between the burner and the glass bath which does not permit an easy mounting of the jets. This technique is also complicated due to the narrowness of the feeding channel which requires a rapid mixture of the flame and of oxygen, and to the important number of holes to be made in the lateral wall of the feeder to mount the jets therein. Consequently, such a solution requires important modifications in the existing installations.

A third method consists in using oxycombustible burners. However, the use of such burners requires a new design of the feeder to prevent the refractory elements from overheating, in view of the very high temperature which subsists at the base of the flame of the oxycombustible burners. Therefore, this solution cannot be adapted to the channels for feeding glass as they exist in the equipments which are now in operation.

Presently, we are therefore faced with the problem of using oxygen in the burners operating with air and fuel gas, mounted in the feeders, so as to utilize the existing equipments without modification, while benefiting from the improvements brought about by the use of an overoxygenated combustive material.

SUMMARY OF INVENTION

The invention enables to solve the problem outlined above. The device according to the invention is characterized in that it includes a capillary tube coaxially disposed in said channel and whose diameter is smaller than the diameter of said channel, said capillary tube being connected at its upstream end to oxygen feeding means, and opening at the downstream end of said channel between the end of the coaxial cylindrical duct located towards said channel and the downstream end of said channel.

Preferably, this device in which the diameter of the capillary tube is smaller than that of the coaxial cylindrical duct, is characterized in that the capillary tube opens in said coaxial cylindrical duct.

The diameter of the capillary tube will preferably be equal to:

$$d = \sqrt{\frac{Q}{0.5(P+1)}},$$

wherein d is expressed in millimeter, Q is the minimum flow of oxygen depending on the desired oxygen content of the combustive material, expressed in $Nm^3/h$, P is the relative pressure of the oxygen feed expressed in bars, P being higher than 1 bar.

The invention also concerns a process for the production of glass articles in which the glass originating from a melting oven flows towards a device for shaping said articles, by means of a distribution channel, said channel including at least a burner means to heat and maintain at a predetermined temperature the vein of molten glass flowing in said channel, said process being characterized in that at least one of the burner means is according to the device described above, the flow of oxygen originating from the oxygen feeding means being such that the volume concentration $\Psi$ of oxygen in the combustive material after mixing oxygen and the premixture, in normal conditions of temperature and pressure, remains substantially lower than or equal to 30%.

The operation of the various burner means is preferably carried out in the manner described hereinbelow. The burner means according to the invention are essentially intended to be substituted to the burners which are presently in the feeders. They are fed by means of a premixer connected to the air and fuel gas ducts, thereby maintaining a constant ratio of the air and fuel gas feeds. The control of the burners according to the invention by the same premixer in which adjustments would be made for each variation of the oxygen feed (see hereinbelow) would cause serious problems since the premixer is preset to a certain ratio of air and fuel gas and it is then difficult to produce simultaneous variations, in the premixers presently available on the market, of the flow of air and of fuel gas to give different proportions.

According to a preferred embodiment, the process according to the invention is characterized in that all the burner means are supplied by a premixer of air and fuel gas in a predetermined ratio and according to an adjustable flow, while the burner means are also fed on the one hand with oxygen and on the other hand with fuel gas, which are added to the premixture, and whose respective flows are in the said predetermined ratio.

BRIEF DESCRIPTION OF DRAWINGS

The invention will be better understood by means of the examples which follow, without being restricted thereto, and in connection with the following drawings, in which.

DESCRIPTION OF PREFERRED EMBODIMENT

Figure 1:
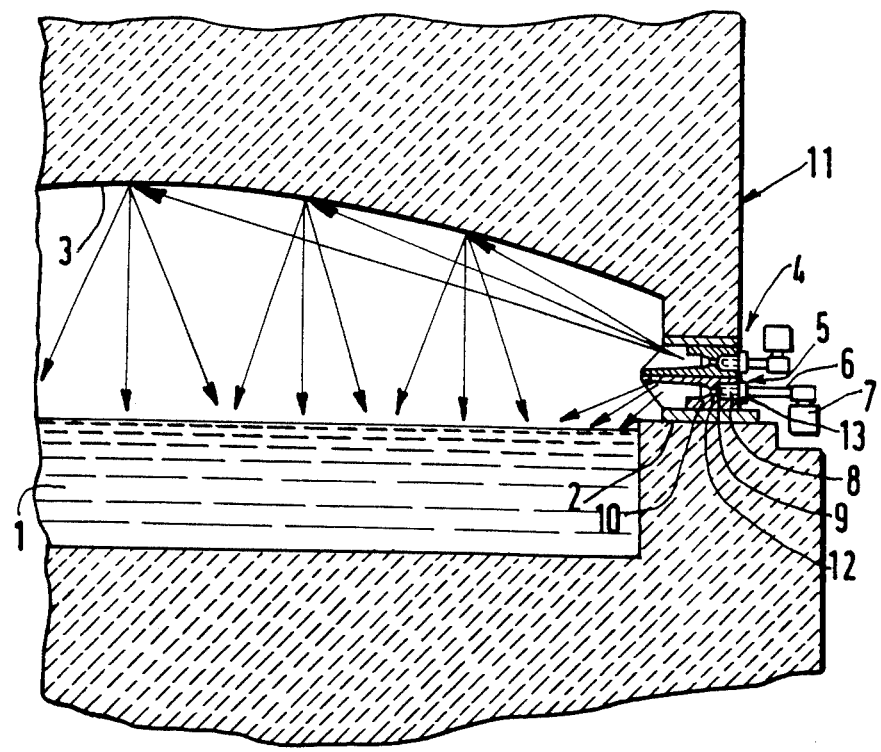
FIG. 1 is an example of a glass distribution channel according to the prior art, provided with air-gas burners.

FIG. 1 represents a first embodiment of heating of a glass distribution channel according to U.S. Pat. No. 3,523,871. The distribution channel 2 in which glass 1 flows is surmounted by a refractory vault 3. In the lateral wall 11 of this channel or feeder, there are respectively provided two identical burners 4 and 5, burner 4 being oriented so as to heat vault 3 while burner 5 is oriented so as to heat the lateral sides of channel 2. The air-gas burners used in the patent mentioned above, respectively comprise a cylindrical duct 6 connected at its upstream end to means 7 for feeding a premixture of air and fuel gas, and whose downstream end 8 opens inside a cylindrical bore 9 provided in a refractory block 10 inserted in the lateral wall 11 of the feeding channel 2. The cylindrical bore 9 has an extension defined by a coaxial cylindrical duct 12 of smaller diameter than that of the bore 9. The cylindrical duct 6 is surrounded by a sealing ring 13 which covers the face of the cylindrical bore 9 in which the channel 6 is inserted.

Figure 2:
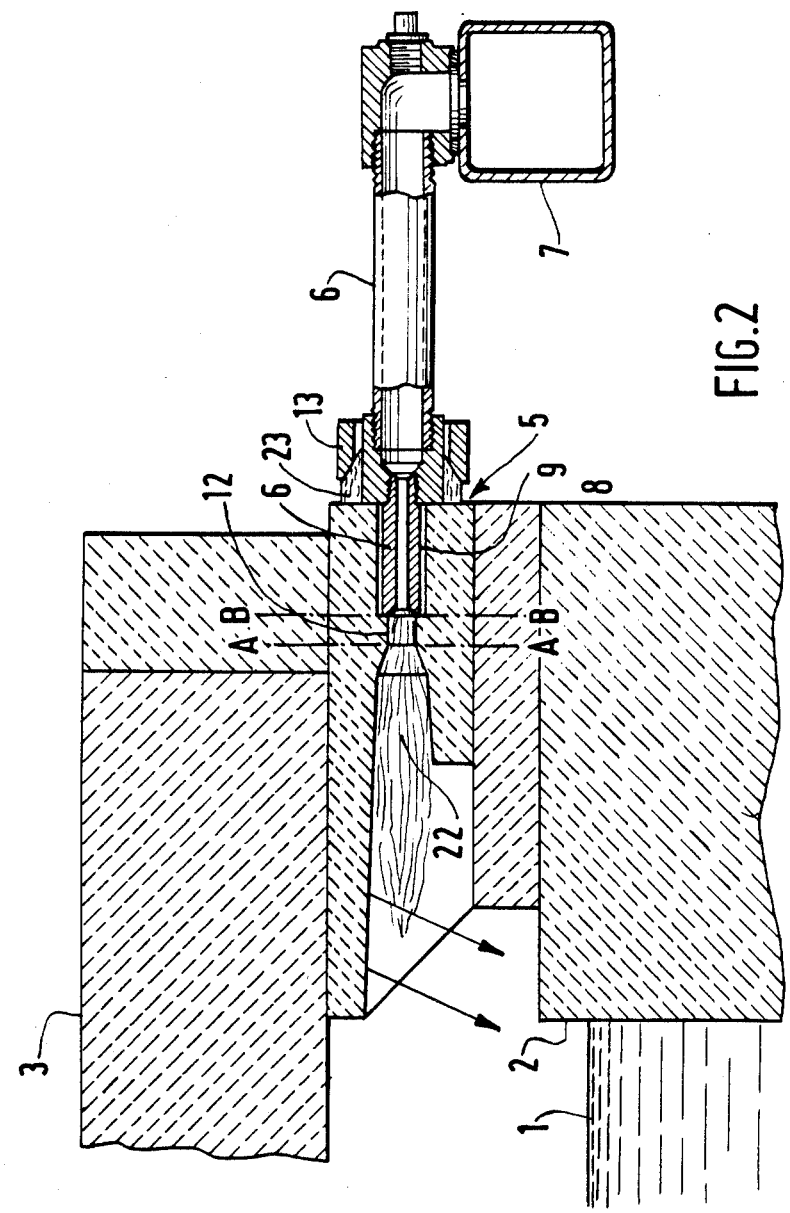
FIG. 2 is a modification of FIG. 1, according to the prior art.

FIG. 2 represents a variant of the embodiment illustrated in FIG. 1, in which a single burner is used, and the vault 3 is flat. This variant is also a variant of the embodiment of the U.S. Patent mentioned above. On this Figure, the same elements as those of the preceding figure are identified by the same reference numerals. Of particular interest is the seal 23 between the sealing ring 13 and the lateral wall in which the cylindrical bore 9 is formed. On this Figure, the cylindrical duct 6 reaches substantially plane B—B which defines the separation between the bore 9 and the coaxial cylindrical duct 12, the latter terminating at its outer end along plane A—A.

Figure 3:
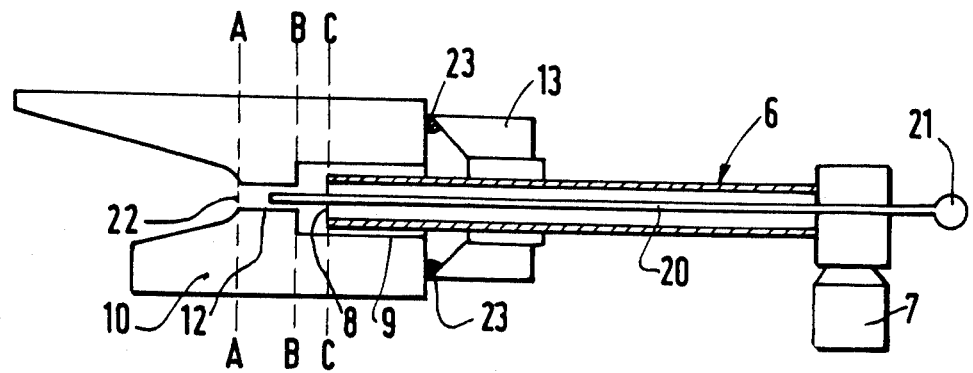
FIG. 3 is a schematic cross-section view of a device according to the invention adapted for heating glass distribution channels.

FIG. 3 represents the device according to the invention and is intended to be substituted to devices 4 and/or 5 of the preceding Figures. In this FIG. 3, the same elements as those which appear in the preceding Figures are identified by the same reference numerals. A capillary tube 20 is coaxially disposed with respect to duct 6, inside the latter. The capillary tube is connected at its upstream end to means 21 for feeding oxygen. This capillary tube opens at the downstream end 8 of the duct 6, and extends inside the coaxial cylindrical duct 12. The downstream end of this capillary tube generally should not extend beyond plane A—A in order to prevent any damage, plugging thereto, etc. It should necessarily extend past plane C—C representing the downstream end 8 of duct 6, in order to prevent oxygen from rising in the premixture and to avoid the risks of explosion which could result therefrom. Preferably, this downstream end of the capillary tube is located in the zone where the flow speed of the premixture is, generally, at the highest possible value, which, on the embodiment illustrated on FIG. 3, is represented by the zone of smallest diameter or coaxial cylindrical duct 12, located between the planes A—A and B—B.

With respect to the different adjustments to be made in a glass distribution channel, reference may be had to French Pat. Nos. 2,022,539, 2,220,480 and 2,350,309, as well as to the above-mentioned U.S. Patent, the disclosure thereof being incorporated by reference in the specification of the present application.

The following examples will show that the oxygen content considerably modifies the combustion yield of the burners according to the invention:

EXAMPLE 1

The oxygen which exists from the capillary tube is injected at the speed of sound so that the mixing between the air-gas premixture and oxygen be as fast as possible. The diameter of the capillary tube is given by the formula mentioned above, i.e.:

$$d = \sqrt{\frac{Q}{0.5(P+1)}},$$

In view of the type of oxygen enrichment used and in order not to overheat the burner block, it has been observed that the concentration in volume of oxygen in the combustive gas (air=oxygen), under normal conditions, should not substantially exceed 30%.

At a smoke temperature of 1200° C. (normal industrial value), the yield obtained goes for 40% to 56.5% of the combustion yield for a standard combustion of natural gas, when $\Psi$ goes from 20.8% to 30%. Similarly, with a commercially available propane gas, the yield goes from 44.2% to 60%.

If the initial flow of natural gas is $Q_{GNO}=1$ associated with an initial flow of air $Q_{AO}$, the increase of the yield will bring about a decrease of this flow to QGN, resulting in a flow of air $Q_A$, a flow of premixture $Q_{PM}$ and a flow of pure $O_2$ $Q_{O2}$.

The results obtained are as follows (with TF=1200° C.; 2% $O_2$ in the dry fumes).

| $\psi$ | $Q_{GNO}$ | $Q_{AO}$ Air | $Q_{PMO}$ Premixture | $Q_{GN}$ | $Q_A$ | $Q_{PM}$ | $Q_{O2}$ |
| --- | --- | --- | --- | --- | --- | --- | --- |
| 0.208 | 1 | 10.1 | 11.1 | 1 | 10.1 | 11.1 | 0 |
| 0.22 | | | | 0.928 | 8.73 | 9.658 | 0.134 |
| 0.23 | | | | 0.881 | 7.82 | 8.701 | 0.223 |
| 0.25 | | | | 0.813 | 6.47 | 7.28 | 0.362 |
| 0.30 | | | | 0.708 | 4.38 | 5.09 | 0.576 |

EXAMPLE 2

This example is carried out under the same conditions as above except that it is carried out with propane.

| $\psi$ | $Q_{CBO}$ | $Q_{AO}$ Air | $Q_{PMO}$ Premixture | $Q_{CB}$ | $Q_A$ | $Q_{PM}$ | $Q_{O2}$ |
| --- | --- | --- | --- | --- | --- | --- | --- |
| 0.208 | 1 | 25.6 | 26.6 | 1 | 25.6 | 26.6 | 0 |
| 0.22 | | | | 0.932 | 22.25 | 23.18 | 0.342 |
| 0.23 | | | | 0.894 | 20.16 | 21.05 | 0.576 |
| 0.25 | | | | 0.834 | 16.85 | 17.68 | 0.944 |
| 0.3 | | | | 0.736 | 11.57 | 12.3 | 1.52 |

The above examples therefore show that the enrichment in oxygen of the device according to the invention enables to reduce the quantity of gas consumed, i.e. realize savings of energy, the price of oxygen being generally lower than that of natural gas or propane.

Such a device also has the advantage that when more than one are used in a distribution channel, it is possible to modulate the over-oxygenation of each channel thereby modulating the local overheating caused by the various burner means, without varying the flow of the air-gas premixture used for all the burners. As a matter of fact, this modulation is carried out exclusively from the auxiliary tank which is used for feeding oxygen, and it should be understood that in this case, the oxygen feed to each of the burner means should be capable of being separately modulated (a valve for regulating the flow for each capillary tube). In addition, such a device and its process of operation enable to increase the temperature of the glass and to preferably heat up the sides of the feeder. Moreover, the overoxygenation produces a moderate increase of the true temperature of the flame, which represents a moderate increase of the temperature of the refractory block. The result is that there is a substantial increase of the radiation from the block towards the sides of the channel which are heated by radiation from the block. (It is known that this radiation is a function of the power 4 of its temperature).

Figure 4:
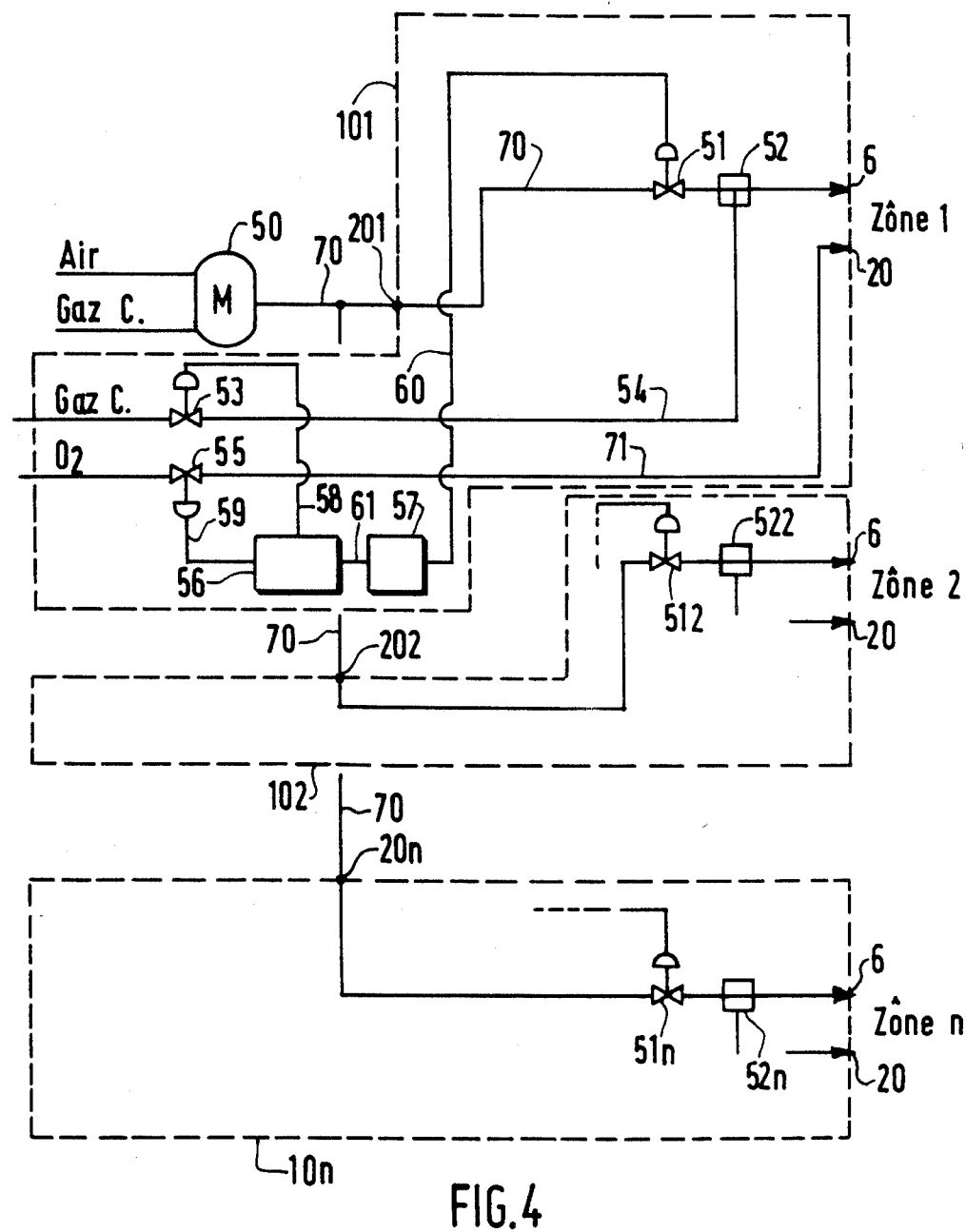
FIG. 4 is a schematic view of an embodiment of a system of operation of a device according to FIG. 3.

FIG. 4 is an embodiment of a control system enabling to modulate for each burner the rate of overoxygenation. At each zone 1, 2, ..., n of the feeder corresponds a burner means according to the invention (it is also possible to connect the system to conventional burners since the premixing device 50 delivers to the duct 70 a conventional mixture of air and fuel gas). Each burner is connected by its ducts 6 and 20 to a control module 101, 102, ..., 10n. Each module comprises an inlet 201, 202, ..., 20n for the duct 70 used to introduce the mixture of air and fuel gas originating from the premixer 50. In view of the fact that all the modules 101, 102, ..., 10n are identical, only module 101 has been represented in details and will now be described.

Duct 70 is connected to adjustable flow control valve 51, and to mixer 52 from which it exits to be connected to cylindrical duct 6. The mixing device 52, well known to anyone skilled in the art, receives the fuel gas to be associated with oxygen (as will be seen later) via duct 54 and adjustable flow control valve 53. The fuel gas is sent to the capillary tube 20 by means of the adjustable flow control valve 55 and duct 71.

The control valve 51 is electrically connected by means of a connection 60 to an electronic flow control device 57, the latter being connected via 61 to the ratio operator 56, which is electrically connected to control valves 53 and 55 respectively via connections 58 and 59. During a variation of the position of the valve 51, which is manually or electrically controlled, the control device 57 enables to proportionately vary the control signal sent towards the ratio operator 56. The latter generates the signal of flow variation in each valve 53 and 55 by maintaining a specific ratio (in general stoechiometric) between the fuel gas and oxygen. Inversely, the rate of overoxygenation is adjusted by modifying the proportion of the control device 57. The ratio operator 56 automatically adjusts the flows of valves 53 and 55 by maintaining stoechiometric conditions, while the device 57 adjusts the oxycombustible power to the variations of the aero-combustible power controlled by the valve 51. Such a system of control presents the following advantages over other systems:

no disadjustment of the premixture is required: the latter operates under the conditions foreseen by the manufacturer, each zone may correspond to a different over-oxygenation and therefore to a different temperature. For this purpose, it is only sufficient to select a different porportion at level 57, as a function of the desired temperature for the corresponding zone. (In manual operation, the total flow of valves 53 and 55 is changed by maintaining the same ratio).

In view of what has been described and by maintaining a stoechiometric ratio of oxygen (air) and natural gas, the tables of examples 1 and 2 are modified as follows:

EXAMPLE 3

(Same conditions as in example 1)

| $\psi$ | $Q_{GNO}$ | $Q_{AO}$ | $Q_{PMO}$ | $Q_{GN(M)}$ | $Q_A$ | $Q_{PM}$ | $Q_{GN(O2)}$ | $Q_{O2}$ | $Q_{GN(T)}$ |
|---|---|---|---|---|---|---|---|---|---|
| 0.208 | 1 | 10.1 | 11.1 | 1 | 10.1 | 11.1 | 0 | 0 | 1 |
| 0.22 | | | | 0.864 | 8.73 | 9.594 | 0.064 | 0.134 | 0.928 |
| 0.23 | | | | 0.774 | 7.82 | 8.594 | 0.107 | 0.223 | 0.881 |
| 0.25 | | | | 0.640 | 6.47 | 7.11 | 0.173 | 0.362 | 0.813 |
| 0.30 | | | | 0.434 | 4.38 | 4.814 | 0.274 | 0.576 | 0.708 |

EXAMPLE 4

(Same conditions as in example 2)

| $\psi$ | $Q_{PO}$ | $Q_{AO}$ | $Q_{PMO}$ | $Q_{P(M)}$ | $Q_A$ | $Q_{PM}$ | $Q_{P(O1)}$ | $Q_{O2}$ | $Q_{P(T)}$ |
|---|---|---|---|---|---|---|---|---|---|
| 0.208 | 1 | 25.6 | 26.6 | 1 | 25.6 | 26.6 | 0 | 0 | 1 |
| 0.22 | | | | 0.869 | 22.25 | 23.12 | 0.063 | 0.342 | 0.932 |
| 0.23 | | | | 0.787 | 20.16 | 20.95 | 0.107 | 0.576 | 0.894 |
| 0.25 | | | | 0.658 | 16.85 | 17.51 | 0.176 | 0.944 | 0.834 |
| 0.30 | | | | 0.452 | 11.57 | 12.02 | 0.284 | 1.52 | 0.736 | with $Q_{GN(M)}$=combustible flow of premixture 50
$Q_{P(M)}$=combustible flow of premixture 50
$Q_{GN(O2)}$=combustible flow in valve 53
$Q_{P(O2)}$=combustible flow in valve 53
$Q_{GN(T)}$=combustible flow of fuel gas ($G_N$=natural gas)
$Q_{P(T)}$=total flow of fuel gas (P=propane).

I claim:

1. Process for manufacturing glass articles, in which glass originating from a furnace flows towards a location for producing said articles by means of a distribution channel, said channel including at least a burner device to heat the molten glass vein flowing in said channel and maintain same at a temperature $T_1$, the process comprising feeding a combined air and gaseous fuel mixture into the burner device, and feeding supplemental oxygen from oxygen feeding means into a feed tube mounted within said burner device, the oxygen flowing from the oxygen feeding means being such that the concentration in volume of oxygen in the combustive mixture after mixing the oxygen and the premixture under normal conditions of temperature and pressure remains substantially lower than or equal to 30%.

2. Process according to claim 1, wherein a plurality of burner devices are fed with a premixture of air and fuel gas in a ratio $R_1$ and according to an adjustable flow, while the burner devices are also fed on the one hand with oxygen and on the other hand with a fuel gas, added to the premixture, whose respective flows are within said ratio $R_1$.

3. Process according to claim 1, wherein a plurality of burner devices are fed from the same auxiliary tank with a premixture of air and fuel gas, according to adjustable flows, while each burner device is fed with oxygen according to an adjustable flow depending on the desired temperature of the flame, a ratio operator enabling the adjustment of the flow of oxygen to the flow of fuel gas.

4. An improved burner device for heating a channel for distribution of glass, said device comprising a refractory block mounted in said glass distribution channel, said refractory block having an outside wall, an inside face and a cylindrical bore, said bore having a first and a second diameter, said first diameter being larger than said second diameter and beginning on said outside wall of said block and further extending partways through said block, said second diameter extending from the inner end of said first diameter to said inside face; a cylindrical duct having a portion mounted inside said first diameter of said bore in said block, said duct extending from beyond said block to within the first diameter of said bore in said block; an annular sealing ring with an inner and outer diameter, said inner diameter of said ring having the same diameter as said cylindrical duct, said ring being mounted around said duct for attaching and sealing said duct to said block; a feed tube mounted inside said duct, the feed tube extending into the second diameter of said cylindrical bore in said block; oxygen feeding means for feeding oxygen to said feed tube; and air/fuel gas feeding means attached to said cylindrical duct for feeding air/fuel gas mixture to said duct.

5. Burner device according to claim 4, in which the diameter of the feed tube is smaller than the second diameter of the cylindrical bore, and wherein said feed tube ends in said cylindrical bore.

6. Burner device according to any one of claim 4, wherein the diameter (d) of the feed tube is equal to:

$$d = \sqrt{\frac{Q}{0.5(P+1)}},$$

d being expressed in millimeters, Q being the minimum flow of oxygen depending on the desired oxygen content of the combustive mixture (expressed in $Nm^3/h$), P being the feeding pressure of oxygen, expressed in bars, P being lower than 1 bar.

7. A burner device according to claim 4, wherein the air/fuel gas feeding means is comprised of air supply means; gas supply means; a premixer coupled to said air supply means and gas supply means for mixing air and fuel gas in a fixed volumetric proportion; a first duct means coupled to said premixer for carrying the air/fuel gas mixture; first valve means coupled to said first duct means for controlling the flow of said mixture; a second duct means coupled to said gas supply means for carrying said gas; second valve means coupled to said second duct means for controlling the flow of said gas; and mixer means coupled to said first valve means and second valve means capable of mixing the air/fuel gas mixture and additional fuel gas together before supplying it to said cylindrical duct.

8. In a burner device according to claim 7, an apparatus for maintaining a stoechiometric ratio between oxygen and fuel gas comprising an oxygen supply means; third valve means coupled to said oxygen supply means for regulating said oxygen supply means; first control means coupled to said first valve means for controlling the supply of said air/fuel gas mixture; and second control means coupled to said third valve means, said second valve means and said first control means for controlling the stoechiometric ratio between said oxygen and said fuel gas.

* * * * *